US012308061B2

(12) United States Patent
Kikuchi et al.

(10) Patent No.: US 12,308,061 B2
(45) Date of Patent: May 20, 2025

(54) OPTICAL RECORDING MEDIUM

(71) Applicant: SONY GROUP CORPORATION, Tokyo (JP)

(72) Inventors: Minoru Kikuchi, Tokyo (JP); Yoko Sekiguchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/578,102

(22) PCT Filed: Mar. 23, 2022

(86) PCT No.: PCT/JP2022/013523
§ 371 (c)(1),
(2) Date: Jan. 10, 2024

(87) PCT Pub. No.: WO2023/007838
PCT Pub. Date: Feb. 2, 2023

(65) Prior Publication Data
US 2024/0339129 A1 Oct. 10, 2024

(30) Foreign Application Priority Data

Jul. 29, 2021 (JP) ................................. 2021-124335

(51) Int. Cl.
*G11B 7/007* (2006.01)
*G11B 7/24041* (2013.01)
(Continued)

(52) U.S. Cl.
CPC ........ *G11B 7/24041* (2013.01); *G11B 7/2534* (2013.01); *G11B 7/2542* (2013.01); *G11B 7/26* (2013.01)

(58) Field of Classification Search
CPC ........ G11B 2007/00656; G11B 7/0065; G11B 2220/2504; G11B 7/007; G11B 2007/00763; H04N 5/89
(Continued)

(56) References Cited

U.S. PATENT DOCUMENTS 10,464,255 B2 * 11/2019 Iwata .................... B32B 27/302

FOREIGN PATENT DOCUMENTS

JP    06-195780 A    7/1994
JP    07-130018 A    5/1995
(Continued)

OTHER PUBLICATIONS

International Search Report and Written Opinion of PCT Application No. PCT/JP2022/013523, issued on Jun. 21, 2022, 11 pages of ISRWO.

*Primary Examiner* — Nabil Z Hindi
(74) *Attorney, Agent, or Firm* — CHIP LAW GROUP

(57) ABSTRACT

Provided is an optical recording medium capable of suppressing sticking between the optical recording mediums in a case where a plurality of optical recording mediums are superimposed on each other. The optical recording medium includes an optical recording medium main body having a first surface and a second surface, and a first convex structure layer provided on the first surface. The first convex structure layer has a surface provided with a plurality of first convexities, and includes first particles and a first resin material. The plurality of first convexities are formed by a part of the first particles included in the first convex structure layer, the part of the first particles protruding from the surface of the first convex structure layer.

10 Claims, 10 Drawing Sheets

(51) Int. Cl.
*G11B 7/2534* (2013.01)
*G11B 7/2542* (2013.01)
*G11B 7/26* (2006.01)

(58) Field of Classification Search
USPC .............................................. 369/103, 275.1
See application file for complete search history.

(56) References Cited

FOREIGN PATENT DOCUMENTS

| | | |
|---|---|---|
| JP | 08-022641 A | 1/1996 |
| JP | 09-320239 A | 12/1997 |
| JP | 11-345431 A | 12/1999 |
| JP | 2009-096927 A | 5/2009 |
| JP | 2009-187625 A | 8/2009 |
| JP | 2012-164383 A | 8/2012 |

* cited by examiner

OPTICAL RECORDING MEDIUM

CROSS REFERENCE TO RELATED APPLICATIONS

This application is a U.S. National Phase of International Patent Application No. PCT/JP2022/013523 filed on Mar. 23, 2022, which claims priority benefit of Japanese Patent Application No. JP 2021-124335 filed in the Japan Patent Office on Jul. 29, 2021. Each of the above-referenced applications is hereby incorporated herein by reference in its entirety.

TECHNICAL FIELD

The present disclosure relates to an optical recording medium.

BACKGROUND ART

An optical recording medium is generally said to have higher storage reliability than a hard disk drive (HDD), a flash memory, or the like due to its recording and reproducing principle. For this reason, in recent years, demand for an optical recording medium as an archival medium has increased. In an optical recording medium, it is generally required to ensure surface smoothness.

In an optical recording medium, a hard coat layer is widely used for the purpose of protecting a medium surface. When the hard coat layer is used, the smoothness of the medium surface is easily impaired, and thus a technique for forming a smooth hard coat layer has been studied. For example, Patent Document 1 discloses an optical recording medium on which a hard coat layer having excellent durability such as scratch resistance, dust resistance, and anti-fouling properties, and having excellent surface smoothness during coating is formed.

CITATION LIST

Patent Document

Patent Document 1: Japanese Patent Application Laid-Open No. 2009-96927

SUMMARY OF THE INVENTION

Problems to be Solved by the Invention

However, optical recording mediums having smooth surfaces may adhere to each other in a case where a plurality of optical recording mediums are superimposed on each other.

An object of the present disclosure is to provide an optical recording medium capable of suppressing sticking between the optical recording mediums in a case where a plurality of optical recording mediums are superimposed on each other.

Solutions to Problems

In order to solve the problem described above, the present disclosure provides an optical recording medium including: an optical recording medium main body that has a first surface and a second surface; and a first convex structure layer that is provided on the first surface, in which the first convex structure layer has a surface provided with a plurality of first convexities, and includes first particles and a first resin material, and the plurality of first convexities are formed by a part of the first particles that are included in the first convex structure layer, the part of the first particles protruding from a surface of the first convex structure layer.

MODE FOR CARRYING OUT THE INVENTION

Embodiments of the present disclosure will be described in the following order.
1. First Embodiment
1.1 Configuration of optical recording medium
1.2 Method for Manufacturing optical recording medium
1.3 Operation and effect
2. Second Embodiment
2.1 Configuration of optical recording medium
2.2 Method for Manufacturing optical recording medium
2.3 Operation and effect
3. Modified examples

1 First Embodiment

[1.1 Configuration of Optical Recording Medium]

Figure 1A:
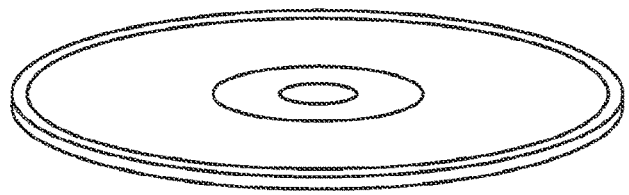
FIG. 1A is a perspective view illustrating an example of an appearance of an optical recording medium according to a first embodiment of the present disclosure.
Figure 1B:
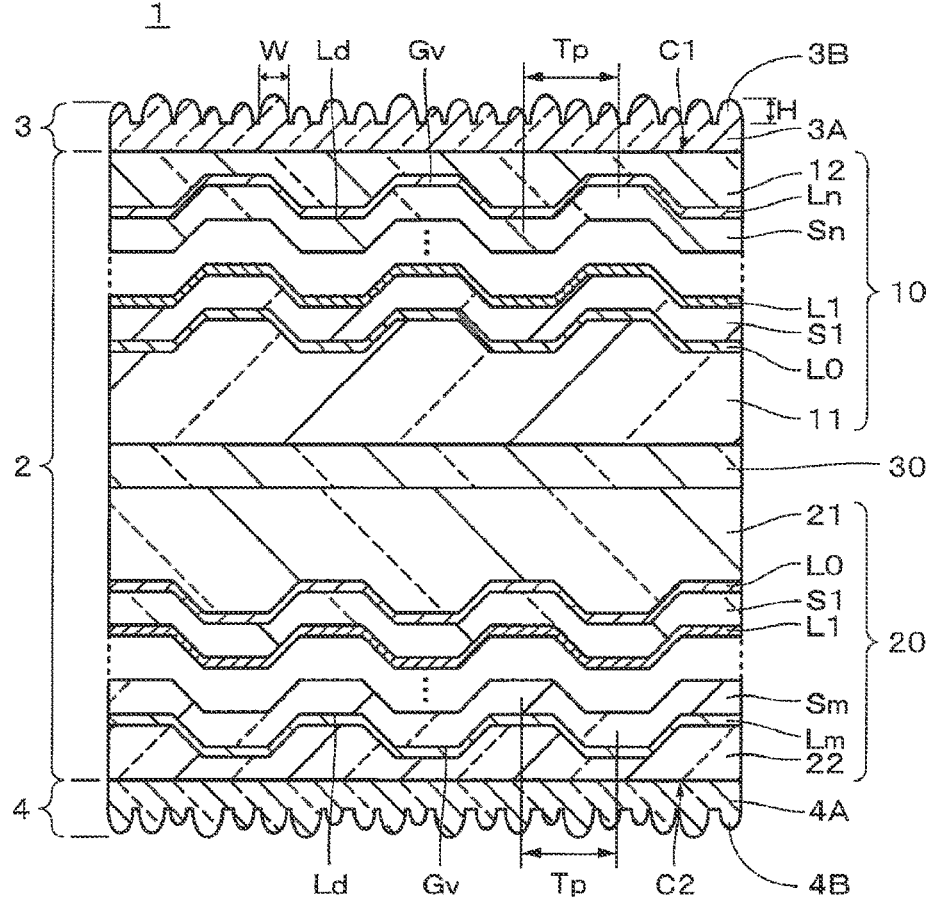
FIG. 1B is a cross-sectional view illustrating an example of a configuration of the optical recording medium according to the first embodiment of the present disclosure.

As illustrated in FIG. 1A, an optical recording medium 1 according to a first embodiment of the present disclosure has a disk shape in which an opening (hereinafter referred to as "center hole") is provided at the center. Note that the shape of the optical recording medium 1 is not limited to this example, and may be, for example, a card shape or the like. The optical recording medium 1 is a so-called multi-layer write-once optical recording medium (for example, BD-DSD), and includes an optical recording medium main body 2, a first convex structure layer 3, and a second convex structure layer 4 as illustrated in FIG. 1B. The optical recording medium 1 is an optical recording medium using a method of recording data on groove tracks (hereinafter referred to as "groove recording method").

(Optical Recording Medium Main Body)

The optical recording medium main body 2 includes a first disk 10, a second disk 20, and a bonding layer 30. The first disk 10 has a configuration in which an information signal layer L0, a spacer layer S1, an information signal layer L1, . . . , a spacer layer Sn, an information signal layer Ln, and a light transmitting layer 12 as a cover layer are laminated in this order on one main surface of a substrate 11. The second disk 20 has a configuration in which an information signal layer L0, a spacer layer S1, an information signal layer L1, . . . , a spacer layer Sm, an information signal layer Lm, and a light transmitting layer 22 as a cover layer are laminated in this order on one main surface of a substrate 21. Here, n and m are different integers of 2 or more, and from the viewpoint of improving the recording capacity, n and m are preferably an integer of 3 or more, more preferably an integer of 4 or more, and still more preferably an integer of 5 or more. Note that, in the following description, in a case where the information signal layers L0 to Ln and L0 to Lm are collectively referred to without being particularly distinguished, they are referred to as an information signal layer L.

Both surfaces of the optical recording medium main body 2 have light irradiation surfaces irradiated with a laser beam for recording or reproducing an information signal. More specifically, the optical recording medium main body 2 has a first light irradiation surface (first surface) C1 irradiated with a laser beam for recording or reproducing an information signal of the first disk 10 and a second light irradiation surface (second surface) C2 irradiated with a laser beam for recording or reproducing an information signal of the second disk 20.

In the first disk 10, the information signal layer L0 is located at the innermost position by reference to the first light irradiation surface C1, and the information signal layers L1 to Ln are located in front of the information signal layer L0. Therefore, the information signal layers L1 to Ln are configured to allow transmission of a laser beam used for recording or reproduction. On the other hand, in the second disk 20, the information signal layer L0 is located at the innermost position by reference to the second light irradiation surface C2, and the information signal layers L1 to Lm are located in front of the information signal layer L0. Therefore, the information signal layers L1 to Lm are configured to allow transmission of a laser beam used for recording or reproduction.

In the optical recording medium 1, the information signal of the first disk 10 is recorded or reproduced as follows. That is, each of the information signal layers L0 to Ln included in the first disk 10 is irradiated with the laser beam from the first light irradiation surface C1 on the light transmitting layer 12 side, so that the information signal of the first disk 10 is recorded or reproduced. For example, the laser beam having a wavelength in a range of 350 nm or more and 415 nm or less is condensed by an objective lens having a numerical aperture in a range of 0.84 or more and 0.95 or less, and each of the information signal layers L0 to Ln included in the first disk 10 is irradiated with the laser beam from the light transmitting layer 12 side, so that the information signal is recorded or reproduced.

On the other hand, the information signal of the second disk 20 is recorded or reproduced as follows. That is, each of the information signal layers L0 to Lm included in the second disk 20 is irradiated with the laser beam from the second light irradiation surface C2 on the light transmitting layer 22 side, so that the information signal of the second disk 20 is recorded or reproduced. For example, the laser beam having a wavelength in a range of 350 nm or more and 415 nm or less is condensed by an objective lens having a numerical aperture in a range of 0.84 or more and 0.95 or less, and each of the information signal layers L0 to Lm included in the second disk 20 is irradiated with the laser beam from the light transmitting layer 22 side, so that the information signal is recorded or reproduced.

Hereinafter, the substrates 11 and 21, the bonding layer 30, the information signal layers L0 to Ln and L0 to Lm, the spacer layers S1 to Sn and S1 to Sm, the light transmitting layers 12 and 22, and the first and the second convex structure layers 3 and 4 constituting the optical recording medium 1 will be sequentially described.

(Substrate)

The substrates 11 and 21 have, for example, a disk shape in which a center hole is provided at the center. One main surface of each of the substrates 11 and 21 is, for example, an uneven surface, and the information signal layer L0 is formed on the uneven surface. Hereinafter, in the uneven surface, the recess is referred to as a land Ld, and the convexity is referred to as a groove Gv.

Examples of the shape of the land Ld and the groove Gv include various shapes such as a spiral shape and a concentric shape. Furthermore, the land Ld and/or the groove Gv may be wobbled (meandered) for stabilizing the linear velocity, adding the address information, or the like. Spiral directions of the land Ld and the groove Gv in the first disk 10 and the second disk 20 may be the same or opposite.

The outer diameter (diameter) of the substrates 11 and 21 is selected to be, for example, 120 mm. The inner diameter (diameter) of the substrates 11 and 21 is selected to be, for example, 15 mm. The thickness of the substrate 11 is selected in consideration of rigidity, and is preferably 0.3 mm or more and 0.545 mm or less, and more preferably 0.445 mm or more and 0.545 mm or less.

As a material of the substrates 11 and 21, for example, a plastic material or glass can be used, and it is preferable to use a plastic material from the viewpoint of moldability. As the plastic material, for example, a polycarbonate-based resin, a polyolefin-based resin, an acrylic-based resin, or the like can be used, and it is preferable to use a polycarbonate-based resin from the viewpoint of cost.

(Bonding Layer)

The bonding layer 30 is provided between the first disk 10 and the second disk 20. The bonding layer 30 bonds the first disk 10 and the second disk 20 together. More specifically, the surface on the substrate 11 side of the first disk 10 and the surface on the substrate 21 side of the second disk substrate are bonded together in such a manner that the light transmitting layers 12 and 22 are on the surface side, respectively.

The bonding layer 30 is configured by a cured ultraviolet curable resin. The thickness of the bonding layer 30 is, for example, 0.01 mm or more and 0.22 mm or less. The ultraviolet curable resin is, for example, a radical polymerization type ultraviolet curable resin.

(Information Signal Layer)

The information signal layer L has a recessed track (hereinafter referred to as "land track") and a convex track (hereinafter referred to as "groove track"). The optical recording medium 1 according to the first embodiment is configured to be capable of recording an information signal in the groove track. A track pitch Tp between the land track and the groove track is preferably 0.32 µm or less, and more preferably less than 0.32 µm from the viewpoint of high recording density. The lower limit value of the track pitch Tp is not particularly limited, but is, for example, 0.12 µm or more.

Figure 2:
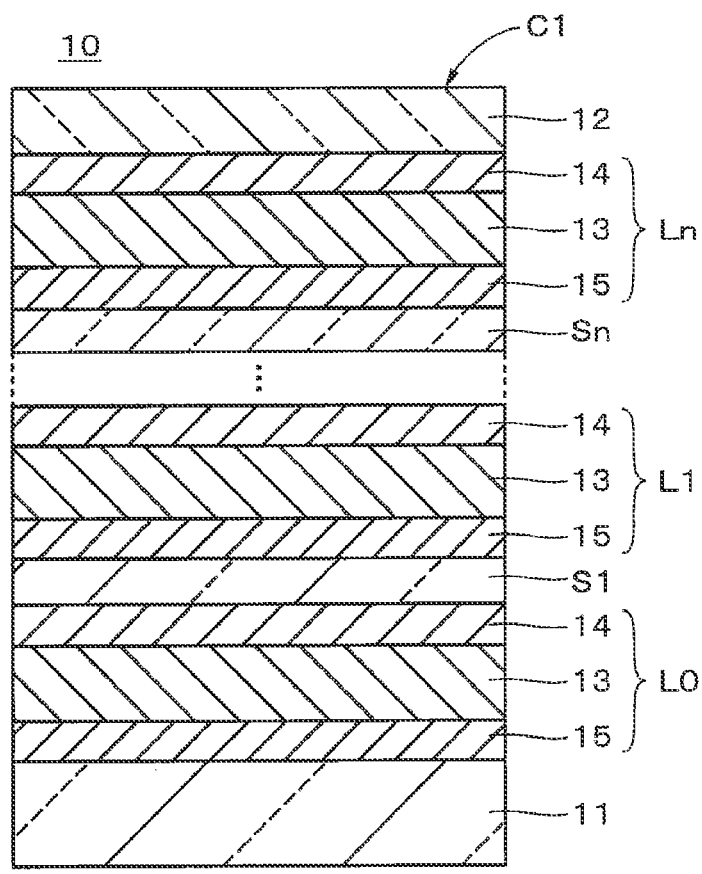
FIG. 2 is a cross-sectional view illustrating an example of a configuration of each information signal layer illustrated in FIGS. 1A and 1B.

As illustrated in FIG. 2, each of the information signal layers L0 to Ln includes an inorganic recording layer (hereinafter simply referred to as "recording layer") 13 having an upper surface (first main surface) and a lower surface (second main surface), a protective layer 14 provided adjacent to the upper surface of the recording layer 13, and a protective layer 15 provided adjacent to the lower surface of the recording layer 13. With such a configuration, the durability of the recording layer 13 can be improved. Here, of both main surfaces of the recording layer 13, the upper surface refers to a main surface on a side irradiated with a laser beam for recording or reproducing an information signal, and the lower surface refers to a main surface on a side opposite to the side irradiated with the laser beam described above, that is, a main surface on the substrate 11 side. Note that the configurations of the information signal layers L0 to Lm can be similar to those of the information signal layers L0 to Ln, and thus the description thereof will be omitted.

(Recording Layer)

The recording layer 13 is configured to be capable of recording an information signal by irradiation with a laser beam. Specifically, the recording layer 13 is configured to be capable of forming a recording mark by irradiation with a laser beam. The recording layer 13 is an inorganic recording layer and contains metal oxide that serves as an inorganic recording material as the main component. The metal oxide is, for example, an inorganic recording material containing manganese oxide (MnO-based material), an inorganic recording material containing palladium oxide (PdO-based material), an inorganic recording material containing copper oxide (CuO-based material), or an inorganic recording material containing silver oxide (AgO-based material).

The MnO-based material preferably further contains one or both of tungsten oxide and molybdenum oxide, and zirconium oxide, in addition to manganese oxide. The MnO-based material may further contain one or both of nickel oxide and magnesium oxide, together with or without these oxides in addition to manganese oxide.

The PdO-based material preferably further contains tungsten oxide and copper oxide, in addition to palladium oxide, and more preferably further contains tungsten oxide, copper oxide, and zinc oxide.

The thickness of the recording layer 13 is preferably in a range of 25 nm or more and 60 nm or less, and more preferably in a range of 30 nm or more and 50 nm or less. When the thickness of the recording layer 13 is 25 nm or more, excellent signal characteristics can be obtained. On the other hand, when the thickness of the recording layer 13 is 60 nm or less, a wide recording power margin can be secured.

(Protective Layer)

The protective layers 14 and 15 may have a function as an oxygen barrier layer. Thus, the durability of the recording layer 13 can be improved. In addition, the protective layers 14 and 15 may have a function of suppressing escape of oxygen in the recording layer 13. As a result, a change in film quality of the recording layer 13 (mainly detected as a decrease in reflectance) can be suppressed, and as the recording layer 13, a preferable film quality can be secured. In addition, the protective layers 14 and 15 may have a function of improving recording characteristics.

The protective layers 14 and 15 include a dielectric. The dielectric includes, for example, at least one or more selected from the group consisting of oxides, nitrides, sulfides, carbides, and fluorides. As the materials of the protective layers 14 and 15, the same or different materials can be used. Examples of the oxides include oxides of one or more elements selected from the group consisting of In, Zn, Sn, Al, Si, Ge, Ti, Ga, Ta, Nb, Hf, Zr, Cr, Bi, and Mg. Examples of the nitrides include nitrides of one or more elements selected from the group consisting of In, Sn, Ge, Cr, Si, Al, Nb, Mo, Ti, Nb, Mo, Ti, W, Ta, and Zn, preferably nitrides of one or more elements selected from the group consisting of S1, Ge, and Ti. Examples of the sulfides include Zn sulfides. Examples of the carbides include carbides of one or more elements selected from the group consisting of In, Sn, Ge, Cr, Si, Al, Ti, Zr, Ta, and W, preferably carbides of one or more elements selected from the group consisting of Si, Ti, and W. Examples of the fluorides include fluorides of one or more elements selected from the group consisting of Si, Al, Mg, Ca, and La. Specific examples of these mixtures include $ZnS$—$SiO_2$, $SiO_2$—$In_2O_3$—$ZrO_2$(SIZ), $SiO_2$—$Cr_2O_3$—$ZrO_2$(SCZ), $In_2O_3$—$SnO_2$ (ITO), $In_2O_3$—$CeO_2$(ICO), $In_2O_3$—$Ga_2O_3$(IGO), $In_2O_3$—$Ga_2O_3$—$ZnO$(IGZO), $Sn_2O_3$—$Ta_2O_5$ (TTO), $TiO_2$—$SiO_2$, $Al_2O_3$—$ZnO$, $Al_2O_3$—$BaO$, and the like.

The thickness of the protective layer 15 is preferably in a range of 2 nm or more and 30 nm or less. When the thickness of the protective layer 15 is 2 nm or more, an excellent barrier effect can be obtained. On the other hand, when the thickness of the protective layer 15 is 30 nm or less, a decrease in the recording power margin can be suppressed.

The thickness of the protective layer 14 is preferably in a range of 2 nm or more and 50 nm or less. When the thickness of the protective layer 14 is 2 nm or more, an excellent barrier effect can be obtained. On the other hand, when the thickness of the protective layer 14 is 50 nm or less, a decrease in the recording power margin can be suppressed.

(Spacer Layer)

Each of the spacer layers S1 to Sn and S1 to Sm has a role of separating the information signal layers L0 to Ln and L0 to Lm at physically and optically sufficient distances, and an uneven surface is provided on a surface thereof. The uneven surface forms, for example, the land Ld and the groove Gv in a concentric or spiral shape. The thicknesses of the spacer layers S1 to Sn and S1 to Sm are preferably 9 µm or more and 50 µm or less. The material of the spacer layers S1 to Sn and S1 to Sm is not particularly limited, but it is preferable to use the ultraviolet curable acrylic resin. In addition, since the spacer layers S1 to Sn and S1 to Sm are optical paths of the laser beam for recording and reproducing data in the back layer, it is preferable that the spacer layers S1 to Sn and S1 to Sm have sufficiently high optical transparency.

(Light Transmitting Layer)

The light transmitting layers 12 and 22 are, for example, resin layers formed by curing a photosensitive resin such as an ultraviolet curable resin. Examples of the ultraviolet curable resin include an ultraviolet curable-type acrylic-based resin. In addition, the light transmitting layers 12 and 22 may include a light transmissive sheet having an annular shape and an adhesive layer for bonding the light transmitting sheet to the information signal layers Ln and Lm. The light transmissive sheet preferably includes a material having a low absorption capacity with respect to the laser beam used for recording and reproduction, and specifically, preferably includes a material having a transmittance of 90% or more. As a material of the light transmissive sheet, for example, a polycarbonate-based resin, a polyolefin-based resin (for example, ZEONEX (registered trademark)), or the like can be used. As a material of the adhesive layer, for example, an ultraviolet curable resin, a pressure sensitive adhesive (PSA), or the like can be used.

The thickness of each of the light transmitting layers 12 and 22 is preferably selected from a range of 10 µm or more and 177 µm or less, and is selected to be, for example, 57 µm. High-density recording can be realized by combining such thin light transmitting layers 12 and 22 with an objective lens having a high numerical aperture (NA) of, for example, about 0.85.

(First and Second Convex Structure Layers)

The first convex structure layer 3 is a hard coat layer having a surface having a plurality of convexities (first convexities) 3B. Specifically, the first convex structure layer 3 includes a base layer 3A which is a hard coat layer main body and a plurality of convexities 3B provided on the surface of the base layer 3A. The second convex structure layer 4 is a hard coat layer having a surface having a plurality of convexities (second convexities) 4B. Specifically, the second convex structure layer 4 includes a base layer 4A which is a hard coat layer main body and a plurality of convexities 4B provided on the surface of the base layer 4A. Since the plurality of convexities 3B are provided on the surface of the first convex structure layer 3 and the plurality of convexities 4B are provided on the surface of the second convex structure layer 4, it is possible to suppress sticking of the optical recording mediums 1 in a case where a plurality of optical recording mediums 1 are superimposed on each other. Furthermore, the first and the second convex structure layers 3 and 4 can impart scratch resistance to the first and the second light irradiation surfaces C1 and C2, respectively. The first and the second convex structure layers 3 and 4 may be capable of imparting a reflection suppressing function of suppressing reflection of the laser beam for recording or reproducing an information signal to the first and the second light irradiation surfaces C1 and C2, respectively. The first convex structure layer 3 is provided on the first light irradiation surface C1 of the optical recording medium main body 2. The second convex structure layer 4 is provided on the second light irradiation surface C2 of the optical recording medium main body 2.

Since the second convex structure layer 4 has a similar configuration to the first convex structure layer 3, the configuration of the first convex structure layer 3 will be described below. The first convex structure layer 3 includes, for example, particles (first particles) and a resin material (first resin material). A plurality of convexities 3B are formed by a part of the particles that are included in the first convex structure layer 3, the part of the particles protruding from the surface of the first convex structure layer 3. The plurality of convexities 3B are randomly provided on the surface of the first convex structure layer 3. The heights of the plurality of convexities 3B are randomly changed.

The particles preferably have transparency to the laser beam for recording or reproducing an information signal. The particles include, for example, at least one selected from the group consisting of inorganic particles and organic particles. The inorganic particles contain, for example, a metal oxide. The metal oxide includes, for example, at least one selected from the group consisting of a silicon oxide, an aluminum oxide, a zirconium oxide, and a titanium oxide.

The average particle diameter of the particles is preferably 50 nm or more and 100 nm or less. When the average particle diameter of the particles is 50 nm or more and 100 nm or less, the area ratio of the convexity 3B having the highest height and the convexity 3B having a height of 10 nm or more can be adjusted to preferable ranges.

The average particle diameter of the particles is determined as follows. First, the optical recording medium 1 is processed into a thin piece by a focused ion beam (FIB) method or the like. The cross section of the resulting thin piece sample is observed in cross section using a transmission electron microscope (TEM) in such a manner that the entire first convex structure layer 3 is included, and a TEM photograph is imaged. Next, 50 particles are randomly selected from the imaged TEM photograph, and the particle diameter of each particle is measured. In a case where the particle is not spherical, the particle diameter means the largest one of the distances between two parallel lines drawn from all angles so as to be in contact with a contour of each particle (so-called maximum Feret's diameter). Next, the average particle diameter of the particles is determined by simply averaging (arithmetically averaging) the particle diameters of the measured 50 particles.

Examples of the shape of the inorganic particles include a substantially spherical shape (including a spherical shape), a substantially ellipsoidal shape (including an ellipsoidal shape), a plate shape, a bar shape (rod shape), an irregular shape, and the like, but the shape is not particularly limited thereto. Note that two or more types of particles having the shape described above may be used in combination.

The resin material includes at least one selected from the group consisting of acrylic-based resin, silicone-based resin, fluorine-based resin, organic-inorganic hybrid resin, and the like. From the viewpoint of improving antifouling properties, it is preferable to include fluorine-based resin containing fluorine. The resin material may be a polymer of acrylate, and from the viewpoint of improving antifouling properties, is preferably a copolymer of acrylate and a fluorine-containing compound such as a fluorine-containing monomer.

The thickness of the base layer 3A is preferably 1.5 µm or more and 3.5 µm or less. When the thickness of the base layer 3A is less than 1.5 µm, it may be difficult to uniformly apply the ultraviolet curable resin for forming the first convex structure layer (hereinafter referred to as "ultraviolet curable resin for HC") to the first light irradiation surface C1 by a coating method such as spin coating. On the other hand, when the thickness of the base layer 3A exceeds 3.5 µm, the curing shrinkage of the ultraviolet curable resin for HC becomes larger when the ultraviolet curable resin for HC is applied and cured on the first light irradiation surface C1 of the first disk 10, and the first disk 10 may be warped. Therefore, it may be difficult to bond the first disk 10 and the second disk 20. Furthermore, when the ultraviolet curable resin for HC is applied and cured, the ultraviolet curable resin for HC may be cracked.

The first convex structure layer 3 preferably contains an antifouling agent. As the antifouling agent, for example, a fluorine-containing compound can be used. The fluorine-containing compound is, for example, a polymer of a fluorine-containing monomer or a fluorine-containing additive. The fluorine-containing compound may be an alkoxysilane compound having a perfluoropolyether group or a fluoroalkyl group. The fluorine-containing monomer may be a compound having one or more fluorine groups and one or two or more (meth) acryloyl groups. Here, the (meth) acryloyl group is either an acryloyl group or a methacryloyl group.

The highest height of the convexity 3B is preferably 15 nm or more and 200 nm or less, and more preferably 3 nm or more and 100 nm or less. When the highest height of the convexity 3B is 15 nm or more, the effect of suppressing sticking between the optical recording mediums 1 can be improved. On the other hand, when the highest height of the convexity 3B is 200 nm or less, it is possible to suppress the influence of the formation of the first convex structure layer 3 on the characteristics of the optical recording medium 1. Examples of the influence on the characteristics of the optical recording medium 1 include a decrease in reflectance of the information signal layer L and an increase in focus servo residual of the information signal layer L, and the like. The highest height of the convexity 3B is obtained by a measurement method described in examples described later.

The area ratio of the convexity 3B having a height of 10 nm or more is preferably 5% or more, and more preferably 5% or more and 95% or less. When the area ratio of the convexity 3B having a height of 10 nm or more is 5% or more, the effect of suppressing sticking between the optical recording mediums 1 can be improved. When the area ratio of the convexity 3B having a height of 10 nm or more is 95% or less, it is possible to suppress the influence of the formation of the first convex structure layer 3 on the characteristics of the optical recording medium 1. Examples of the influence on the characteristics of the optical recording medium 1 include a decrease in reflectance of the information signal layer L and an increase in focus servo residual of the information signal layer L, and the like. The area ratio of the convexity 3B having a height of 10 nm or more can be obtained by a measurement method described in examples described later.

(Average Contact Angle of Triolein)

The average contact angle of triolein with respect to the first convex structure layer 3 and the second convex structure layer 4 is preferably 60.0 degrees or more, more preferably 65.0 degrees or more, and still more preferably 70.0 degrees or more. When the average contact angle of triolein is 60.0 degrees or more, excellent antifouling properties can be imparted to the first convex structure layer 3 and the second convex structure layer 4. The average contact angle of triolein is obtained by a measurement method described in examples described later.

(Average Sticking Force)

In a case where the optical recording mediums 1 are superimposed on each other, the average sticking force of the superimposed optical recording mediums 1 is preferably 2.00 N or less. When the average sticking force is 2.00 N or less, the superimposed optical recording mediums 1 can be easily peeled off. The average sticking force is obtained by a measurement method described in examples described later.

[1.2 Method for Manufacturing Optical Recording Medium]

Next, an example of a method for manufacturing the optical recording medium 1 according to the first embodiment of the present disclosure will be described.

(Step of Producing First Disk)

First, the first disk 10 is produced as follows.

(Step of Molding Substrate)

First, the substrate 11 having an uneven surface formed on one main surface is molded. As a method of molding the substrate 11, for example, an injection molding (injection) method, a photopolymer method (2P method: Photo Polymerization), or the like can be used.

(Step of Forming Information Signal Layer)

Next, the information signal layer L0 is formed by sequentially laminating the protective layer 15, the recording layer 13, and the protective layer 14 on the substrate 11 by, for example, a sputtering method.

(Step of Forming Spacer Layer)

Next, an ultraviolet curable resin is uniformly applied onto the information signal layer L0 by, for example, a spin coating method. Thereafter, the uneven pattern of the stamper is pressed against the ultraviolet curable resin uniformly applied onto the information signal layer L0, and the ultraviolet curable resin is irradiated with ultraviolet light to be cured, and then the stamper is peeled off. As a result, the uneven pattern of the stamper is transferred to the ultraviolet curable resin, and for example, the spacer layer S1 provided with the land Ld and the groove Gv is formed on the information signal layer La.

(Step of Forming Information Signal Layer and Step of Forming Spacer Layer)

Next, the information signal layer L1, the spacer layer S2, the information signal layer L3, . . . , the spacer layer Sn, and the information signal layer Ln are laminated on the spacer layer S1 in this order in a similar manner to the "Step of forming information signal layer" and "Step of forming spacer layer" described above.

(Step of Forming Light Transmitting Layer)

Next, a photosensitive resin such as an ultraviolet curable resin (UV resin) is spin-coated on the information signal layer Ln by, for example, a spin coating method, and then the photosensitive resin is irradiated with light such as ultraviolet light and cured. As a result, the light transmitting layer 12 is formed on the information signal layer Ln.

(Step of Forming First Convex Structure Layer and Second Convex Structure Layer)

Next, for example, an antiblocking agent (dispersion) containing particles and acrylate, an ultraviolet curable resin, and an antifouling agent as necessary are blended to prepare an ultraviolet curable resin for HC.

As the acrylate, a compound having two or more (meth) acryloyl groups is preferably used. The compound described above may be either a monomer or an oligomer. The acrylate may contain both the monomer and the oligomer as a compound having two or more (meth) acryloyl groups. Examples of the compound described above include urethane (meth) acrylate, epoxy (meth) acrylate, polyester (meth) acrylate, polyol (meth) acrylate, polyether (meth) acrylate, and melamine (meth) acrylate, and the like. Here, the (meth) acryloyl group is either an acryloyl group or a methacryloyl group. Here, the oligomer refers to a molecule having a number average molecular weight (Mn) of 500 or more and 60,000 or less.

The content of the antiblocking agent in the ultraviolet curable resin for HC is preferably 1% by mass or more and 20% by mass or less. When the content of the antiblocking agent is 1% by mass or more, the effect of suppressing sticking between the optical recording mediums 1 can be improved. On the other hand, when the content of the antiblocking agent is 20% by mass or less, it is possible to suppress the influence of the formation of the first convex structure layer 3 and the second convex structure layer 4 on the characteristics of the optical recording medium 1.

The content of the antifouling agent in the ultraviolet curable resin for HC is preferably 1% by mass or more and 10% by mass or less. When the content of the antifouling agent is 1% by mass or more, excellent antifouling properties can be imparted to the first convex structure layer 3 and the second convex structure layer 4. On the other hand, when the content of the antifouling agent is 10% by mass or less, it is possible to suppress the surfaces of the first convex structure layer 3 and the second convex structure layer 4 from becoming orange peel. Therefore, the surfaces of the first convex structure layer 3 and the second convex structure layer 4 can be made flat at a visual level.

Next, the ultraviolet curable resin for HC is applied to the first light irradiation surface C1 of the first disk 10 by a spin coating method, and the ultraviolet curable resin for HC is irradiated with ultraviolet light to cure the ultraviolet curable resin. As a result, the first convex structure layer 3 is formed on the first light irradiation surface C1 of the first disk 10.

(Step of Producing Second Disk)

Next, after the second disk 20 is produced in a similar manner to the "Step of producing first disk" described above, the second convex structure layer 4 is formed on the second light irradiation surface C2 of the second disk 20.

(Bonding Step)

Next, an ultraviolet curable resin as an adhesive is stretched between the first and the second disks 10 and 20 prepared as described above by, for example, a spin coating method in the following manner. First, the ultraviolet curable resin is applied in a ring shape along the peripheral edge of the center hole on the main surface, of both main surfaces of the second disk 20, on the side opposite to the second light irradiation surface C2. Next, the first disk 10 is pressed against the second disk 20 with the ultraviolet curable resin therebetween in such a manner that the main surface, of both main surfaces of the first disk 10, on the side opposite to the first light irradiation surface C1 and the main surface, of both main surfaces of the second disk 20, on the side opposite to the second light irradiation surface C2 face each other.

Next, the first and the second disks 10 and 20 are rotated to stretch the ultraviolet curable resin in the radial direction of the first and the second disks 10 and 20 between the first and the second disks 10 and 20. At this time, the thickness of the ultraviolet curable resin is adjusted to a predetermined thickness depending on the rotation speed. Thus, the ultraviolet curable resin is spread from the inner peripheral portion to the outer peripheral portion of the first and the second disks 10 and 20 between the first and the second disks 10 and 20. As described above, the optical recording medium main body 2 having the uncured bonding layer 30 is obtained.

Note that, in the step of stretching the ultraviolet curable resin described above, the outer peripheral portion of the first and the second disks 10 and 20 is preferably irradiated with ultraviolet light to temporarily cure the ultraviolet curable resin stretched to the outer peripheral portion. As a result, it is possible to suppress the occurrence of opening in the outer peripheral portion of the first and the second disks 10 and 20.

Next, ultraviolet light is irradiated from both sides of the optical recording medium main body 2 using an ultraviolet lamp to cure the bonding layer 30. As a result, the target optical recording medium 1 is obtained.

[1.3 Operation and Effect]

In the optical recording medium 1 according to the first embodiment described above, the first and the second convex structure layers 3 and 4 are provided on the first and the second light irradiation surfaces C1 and C2, respectively. The first convex structure layer 3 has a surface provided with a plurality of convexities (first convexities) 3B, and the plurality of convexities 3B are formed by a part of the particles (first particles) that are included in the first convex structure layer 3, the part of the particles protruding from the surface of the first convex structure layer 3. In addition, the second convex structure layer 4 has a surface provided with a plurality of convexities (second convexities) 4B, and the plurality of convexities 4B are formed by a part of the particles (second particles) that are included in the second convex structure layer 4, the part of the particles protruding from the surface of the second convex structure layer 4. As a result, in a case where the plurality of optical recording mediums 1 are superimposed on each other, the contact area of the superimposed optical recording mediums 1 can be reduced. Therefore, sticking of the superimposed optical recording mediums 1 can be suppressed.

In a case where the first and the second convex structure layers 3 and 4 contain fluorine, antifouling properties can be imparted to the first and the second light irradiation surfaces C1 and C2. Therefore, it is possible to suppress adhesion of fingerprints, stains, and the like to the first and the second light irradiation surfaces C1 and C2.

In the method for forming the first and the second convex structure layers by applying the ultraviolet curable resin to each of the first light irradiation surface of the first disk and the second light irradiation surface of the second disk and transferring the uneven shape of the master disk to the ultraviolet curable resin, there is a possibility that the manufacturing steps increase and the manufacturing efficiency of the optical recording medium decreases.

On the other hand, in the method for manufacturing the optical recording medium according to the first embodiment, the first convex structure layer 3 and the second convex structure layer 4 can be formed by applying and curing the ultraviolet curable resin for HC containing particles to the first light irradiation surface C1 of the first disk 10 and the second light irradiation surface C2 of the second disk 20, respectively. Therefore, since the step of transferring the uneven shape of the master disk to the ultraviolet curable resin is unnecessary, it is possible to suppress an increase in manufacturing steps and suppress a decrease in manufacturing efficiency of the optical recording medium 1.

2. Second Embodiment

[2.1 Configuration of Optical Recording Medium]

Figure 3:
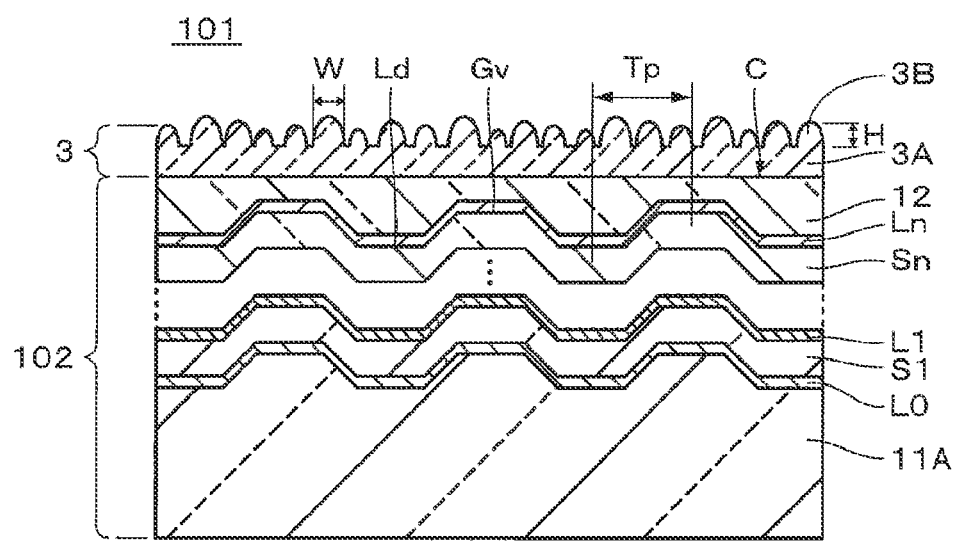
FIG. 3 is a cross-sectional view illustrating an example of a configuration of an optical recording medium according to a second embodiment of the present disclosure.

As illustrated in FIG. 3, an optical recording medium 101 according to a second embodiment of the present disclosure is a so-called multi-layered write-once optical recording medium, and includes an optical recording medium main body 102 and a first convex structure layer 3. Note that, in the second embodiment, a portion similar to that in the first embodiment is assigned with the same reference sign and the description thereof is omitted.

The optical recording medium main body 102 has a configuration in which an information signal layer L0, a spacer layer S1, information signal layer L1, . . . , a spacer layer Sn, an information signal layer Ln, and a light transmitting layer 12 as a cover layer are laminated on one main surface of a substrate 11 A in this order.

The optical recording medium 101 has a light irradiation surface C irradiated with light for recording or reproducing an information signal on one side thereof. The information signal layer L0 is located at the innermost position by reference to the light irradiation surface C, and the information signal layers L1 to Ln are located in front of the information signal layer L0. Therefore, the information signal layers L1 to Ln are configured to allow transmission of a laser beam used for recording or reproduction.

In the optical recording medium 101 according to the second embodiment, information signals are recorded or reproduced by irradiating the information signal layers L0 to Ln with the laser beam from the light irradiation surface C on the light transmitting layer 12 side. For example, a laser beam having a wavelength in a range of 400 nm or more and 415 nm or less is condensed by an objective lens having a numerical aperture in a range of 0.84 or more and 0.86 or less, and each of the information signal layers L0 to Ln is irradiated with the laser beam from the light transmitting layer 12 side, so that the information signal is recorded or reproduced. Examples of such an optical recording medium 101 include a multilayer Blu-ray (registered trademark) disc (BD).

The optical recording medium 101 is typically an optical recording medium of a groove recording system, and may be an optical recording medium of a land/groove recording method or the like.

The diameter of the substrate 11A is selected to be, for example, 120 mm. The thickness of the substrate 11A is selected in consideration of rigidity, and is preferably 0.3 mm or more and 1.3 mm or less, more preferably 0.6 mm or more and 1.3 mm or less, for example, 1.1 mm. In addition, the diameter of the center hole is selected to be, for example, 15 mm. The material of the substrate 11A is similar to that of the substrate 11 in the first embodiment described above.

[2.2 Method for Manufacturing Optical Recording Medium]

An example of a method for manufacturing the optical recording medium 101 according to the second embodiment of the present disclosure will be described.

First, an optical recording medium main body 102 is produced in a similar manner to the "Step of producing first disk" in the first embodiment described above. Next, the ultraviolet curable resin for HC is applied to the light irradiation surface C of the optical recording medium main body 102 by a spin coating method, and the ultraviolet curable resin for HC is irradiated with ultraviolet light and cured to form the first convex structure layer 3. As a result, the target optical recording medium 101 is obtained.

[2.3 Operation and Effect]

In the optical recording medium 101 according to the second embodiment described above, effects similar to those of the first embodiment can be obtained.

3. Modified Examples

In the first and the second embodiments described above, the configuration in which the information signal layer L includes the recording layer 13, the protective layer 14 provided adjacent to the upper surface of the recording layer 13, and the protective layer 15 provided adjacent to the lower surface of the recording layer 13 has been described, but the configuration of the information signal layer L is not limited thereto. For example, the protective layer may be provided only on one of the upper surface and the lower surface of the recording layer 13. Furthermore, the information signal layer L may include only a single layer of the recording layer 13. With such a simple configuration, the optical recording mediums 1 and 101 can be made less expensive and their productivity can be improved. This effect becomes more remarkable as the number of information signal layers L increases.

In the first and the second embodiments described above, a case where the multilayer information signal layers L all have the same layer configuration (three-layer configuration) has been described, and the layer configuration may be changed according to characteristics (for example, optical characteristics, durability, and the like) required for every information signal layer L. However, from the viewpoint of productivity, it is preferable that all the information signal layers L have the same layer configuration.

The optical recording medium to which the present disclosure can be applied is not limited to those having the configurations in the first and the second embodiments. For example, the present disclosure is also applicable to an optical recording medium (for example, a compact disc (CD)) having a configuration in which a plurality of information signal layers and protective layers are laminated in this order on a substrate, and recording or reproducing of an information signal is performed by irradiating the plurality of information signal layers with a laser beam from a substrate side, or an optical recording medium (for example, a digital versatile disc (DVD)) having a configuration in which a plurality of information signal layers are provided between two substrates, and recording or reproducing of an information signal is performed by irradiating the plurality of information signal layers with a laser light from at least one substrate side.

In the first embodiment described above, a case where each of the first and the second disks 10 and 20 includes the plurality of information signal layers L has been described, and each of the first and the second disks 10 and 20 may include a single information signal layer L.

In the second embodiment described above, a case where the optical recording medium 101 includes the plurality of information signal layers L has been described, and the optical recording medium 101 may include a single information signal layer L.

In the first embodiment described above, a case where the convex structure layer is provided on both the first light irradiation surface C1 and the second light irradiation surface C2 of the optical recording medium main body 2 has been described, and the convex structure layer may be provided on either the first light irradiation surface C1 or the second light irradiation surface C2 of the optical recording medium main body 2. However, in order to make the reflectance and the transmittance of the first light irradiation surface C1 and the second light irradiation surface C2 substantially the same, it is preferable that the convex structure layer is provided on both the first light irradiation surface C1 and the second light irradiation surface C2 of the optical recording medium main body 2 as in the first embodiment described above.

In the first and the second embodiments described above, a case where the recording layer 13 is an inorganic recording layer has been described, and the recording layer 13 may be an organic recording layer.

In the first and the second the embodiments described above, a case where the optical recording mediums 1 and 101 are a write-once type has been described, and the optical recording mediums 1 and 101 may be a read-only type or a rewritable type.

In the second embodiment described above, a case where the optical recording medium 101 has a configuration capable of recording or reproducing an information signal from only one side has been described, and the optical recording medium 101 may have a configuration capable of recording or reproducing an information signal from both sides. In this case, a plurality of information signal layers L and light transmitting layers 12 are provided on both surfaces of the substrate 11A. In addition, convex structure layers may be provided on both surfaces.

In the first embodiment, one of the first light irradiation surface C1 and the second light irradiation surface C2 may have a convex structure layer, whereas the other may be a surface (smooth surface) without a convex structure layer. In this case, it is possible to determine the front and the back surfaces of the optical recording medium 1 depending on the presence or the absence of the convex structure layer. Specifications (for example, structure) of the first convex structure layer 3 of the first light irradiation surface C1 and the second convex structure layer 4 of the second light irradiation surface C2 may be different. In this case, the front and the back surfaces of the optical recording medium 1 can be determined by differences in specifications between the first convex structure layer 3 and the second convex structure layer 4. Similarly, in the second embodiment described above, a convex structure layer having a different specification may be provided on the light irradiation surface C and the back surface on the opposite side thereof.

In the first embodiment described above, a case where the first and the second convex structure layers 3 and 4 are formed on the first and the second light irradiation surfaces C1 and C2 of the first and the second disks 10 and 20, respectively, before the bonding step has been described, and the first and the second convex structure layers 3 and 4 may be formed on the first and the second light irradiation surfaces C1 and C2 of the optical recording medium main body 2, respectively, after the bonding step.

EXAMPLES

Hereinafter, the present disclosure will be specifically described with reference to examples, but the present disclosure is not limited to these examples.

Hereinafter, the three information signal layers of each of the first disk and the second disk are referred to as "L0 layer", "L1 layer", and "L2 layer" in order from the substrate toward the laser beam irradiation surface.

Example 1

First, 10% by mass of an antiblocking agent (dispersion) in which silica particles having an average particle diameter of 100 nm and a substantially spherical shape were dispersed in an acrylate monomer, 5% by mass of an antifouling agent (fluorine-containing monomer), and 85% by mass of an ultraviolet curable resin were blended to prepare an ultraviolet curable resin for HC. In the antiblocking agent, the blending ratio (mass ratio) of the silica particles and the acrylate monomer was set to about 1:2. Note that a similar antiblocking agent and a similar antifouling agent to those used in Example 1 were also used in Examples 2 to 8 and Comparative Example 1 described below.

Next, an ultraviolet curable resin for HC was applied in a thickness of 2.2 μm onto the first light irradiation surface of the optical disc main body (BD-DSD, recording capacity 200 GB) by a spin coating method, and the ultraviolet curable resin was irradiated with ultraviolet light to cure the ultraviolet curable resin, thereby forming a first hard coat layer (first convex structure layer). Next, a second hard coat layer (second convex structure layer) was formed on the second light irradiation surface of the optical disc main body in a similar manner as to the step of forming the first hard coat layer.

Example 2

An optical disc was produced in a similar manner to Example 1 except that 1% by mass of an antiblocking agent, 5% by mass of an antifouling agent, and 94% by mass of an ultraviolet curable resin were blended to prepare an ultraviolet curable resin for HC.

Example 3

An optical disc was produced in a similar manner to Example 1 except that 20% by mass of the antiblocking agent, 5% by mass of the antifouling agent, and 75% by mass of the ultraviolet curable resin were blended to prepare an ultraviolet curable resin for HC.

Example 4

An optical disc was produced in a similar manner to Example 1 except that 10% by mass of the antiblocking agent, 1% by mass of the antifouling agent, and 89% by mass of the ultraviolet curable resin were blended to prepare an ultraviolet curable resin for HC.

Example 5

An optical disc was produced in a similar manner to Example 1 except that 10% by mass of the antiblocking agent, 10% by mass of the antifouling agent, and 80% by mass of the ultraviolet curable resin were blended to prepare an ultraviolet curable resin for HC.

Example 6

An optical disc was produced in a similar manner to Example 1 except that 30% by mass of the antiblocking agent, 5% by mass of the antifouling agent, and 65% by mass of the ultraviolet curable resin were blended to prepare an ultraviolet curable resin for HC.

Example 7

An optical disc was produced in a similar manner to Example 1 except that 10% by mass of the antiblocking agent and 90% by mass of the ultraviolet curable resin were blended without blending the antifouling agent to prepare an ultraviolet curable resin for HC.

Example 8

An optical disc was produced in a similar manner to Example 1 except that 10% by mass of the antiblocking agent, 15% by mass of the antifouling agent, and 75% by mass of the ultraviolet curable resin were blended to prepare an ultraviolet curable resin for HC.

Comparative Example 1

An optical disc was produced in a similar manner to Example 1 except that 5% of the antifouling agent and 95% by mass of the ultraviolet curable resin were blended without blending the antiblocking agent to prepare an ultraviolet curable resin for HC.

[Evaluation]

The optical discs of Examples 1-8 and Comparative Example 1 obtained as described above were subjected to the respective evaluations below. Note that the respective evaluations below were conducted at 25° C. and 50% RH.

(Area Ratio of Convexity Having Highest Height and Convexity Having Height of 10 nm or More)

Figure 4A:
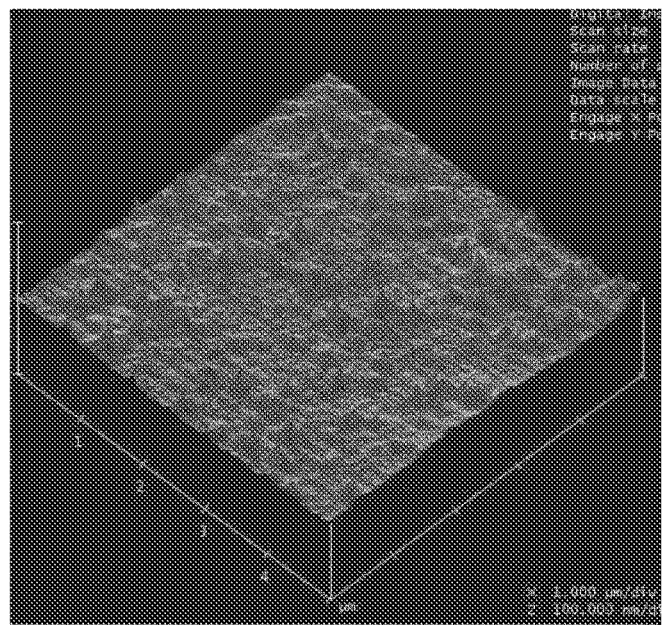
FIG. 4A is an AFM image (3D image) of a surface of a first hard coat layer of Example 1.
Figure 4B:
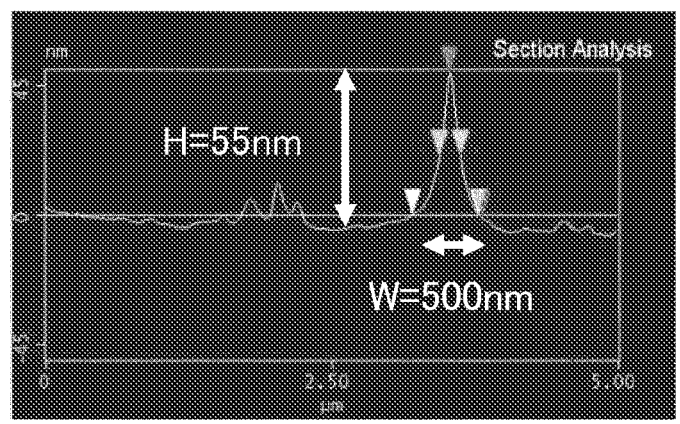
FIG. 4B is a cross-sectional profile illustrating the highest height of the convexity in all the measurement areas of Example 1.

First, Atomic Force Microscope (AFM) images of the surface of the first hard coat layer were acquired at three locations with radii of 24 mm, 40 mm, and 55 mm. FIG. 4A illustrates an AFM image (3D image) of the surface of the first hard coat layer of Example 1. FIG. 4B illustrates the highest height of the convexity in all the measurement areas of Example 1. The highest height of the convexity (height from the lowest point) H is 55 nm, and the widest width W is 500 nm.

AFM and measurement conditions used to acquire the AFM image are as follows.

AFM
    Manufacturer: Veeco (Vacuum Electronic Equipment Co.)
    Device model number: NanoScope IV Measurement Conditions:
    Scan size: 5.0 μm×5.0 μm
    Scan rate: 0.9877 Hz
    Number of samples: 256 points×256 points
    Data processing: with correction (Flatten order: 1)

Next, among the AFM images acquired at the three positions, the convexity having the highest height was selected, and the height of this convexity was defined as the highest height of the convexity H. Furthermore, the width of the convexity having the highest height was defined as the widest width of the convexity W. Next, for the AFM image including the convexity having the highest height of the convexity H, the frequency distribution of the convexity height and the area ratio (Bearing area), which is the ratio between the area at the convexity height and the AFM measurement area, were determined using the bearing (height hierarchy) analysis function of the AFM.

Figure 5:
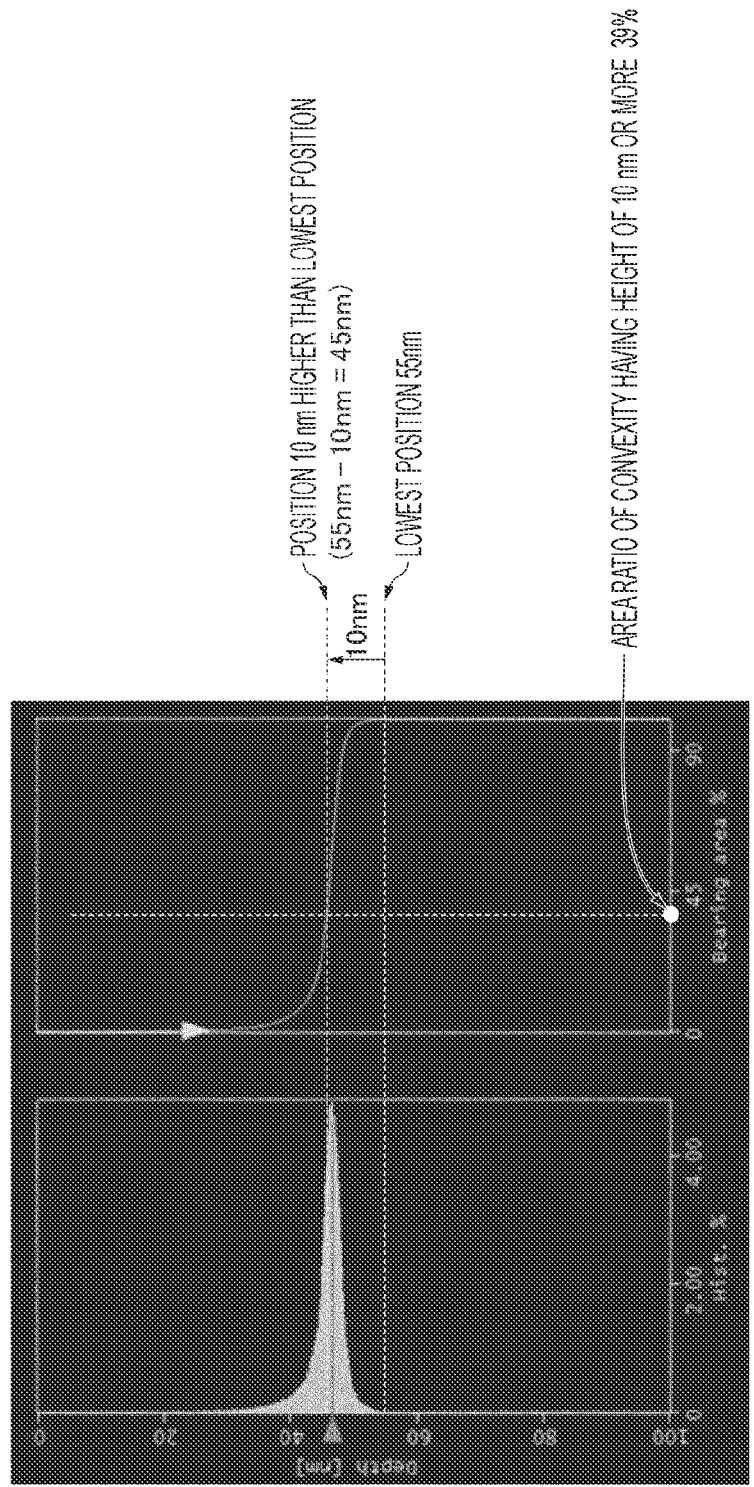
FIG. 5 is a diagram illustrating a bearing analysis result (frequency distribution of convexity height and area ratio of convexity height) of Example 1.

The graph on the left side in FIG. 5 shows a bearing analysis result (frequency distribution of convexity height) of Example 1. The graph on the right side in FIG. 5 shows a bearing analysis result (area ratio of convexity height) of Example 1. In both the left side and the right side graphs, the vertical axis Depth represents the depth from the apex of the convexity having the highest height H (55 nm in Example 1). A position where the Depth is 55 nm is the lowest position of the convexity, that is, the outermost surface of the base layer, the frequency distribution of the graph on the left side is 0 at the position where the Depth is 55 nm, and the area ratio of the graph on the right side is 100% at the position where the Depth is 55 nm.

Next, the area ratio at a position 10 nm higher than the lowest position of the convexity was determined and defined as the area ratio [%] of the convexity having a height of 10 nm or more on surface of the first hard coat layer. The reason why the position is defined as 10 nm higher than the lowest position of the convexity is because the point where the frequency distribution of the convexity height is the highest in the left graph in FIG. 5 is about 10 nm higher than the lowest point. For example, in the case of Example 1, the Depth, which is the lowest position of the convexity, is 55 nm, and the area ratio at a position (45 nm) 10 nm higher than the Depth, which is the lowest position of the convexity, is 39%. Therefore, in Example 1, the area ratio of the convexity having a height of 10 nm or more is 39%. Table 1 shows the highest height of the convexity H, the widest widths of the convexity W, and the area ratio of the convexity having a height of 10 nm or more in Examples 1 to 8 and Comparative Example 1. Here, in Example 8, since an orange peel defect occurred on the entire surface, a smooth portion without a recess in orange peel was selected to acquire an AFM image.

(Surface State)
<Visual Observation>

The surface states of the first hard coat layer and the second hard coat layer were visually observed. The results thereof are shown in Table 1.

<Observation with Optical Microscope>

Figure 6A:
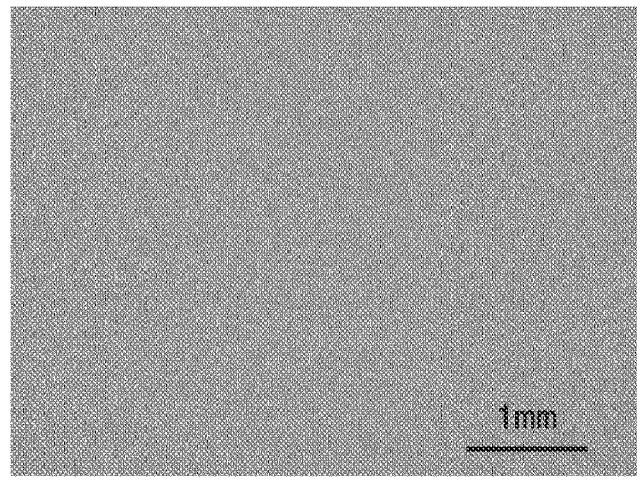
FIG. 6A is an optical microscope photograph of the surface of the first hard coat layer of Example 1.
Figure 6B:
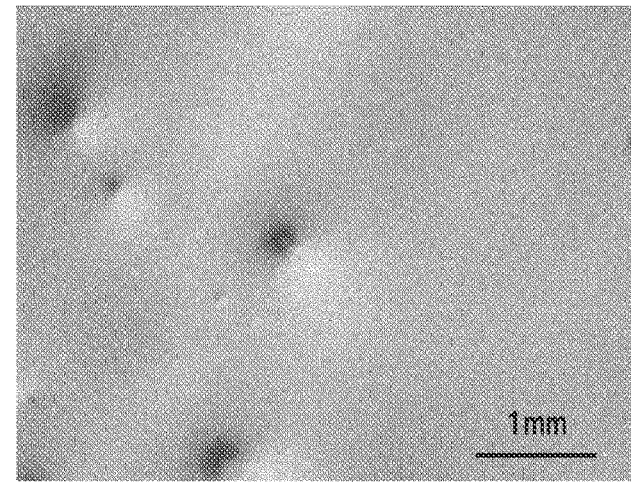
FIG. 6B is an optical microscope photograph of the surface of the first hard coat layer of Example 8.

For the optical discs of Examples 1 and 8, the surface of the first hard coat layer was observed with an optical microscope. FIG. 6A shows an optical microscope photograph of the surface of the first hard coat layer of Example 1, and FIG. 6B shows an optical microscope photograph of the surface of the first hard coat layer of Example 8.

(Average Sticking Force)

Figure 7:
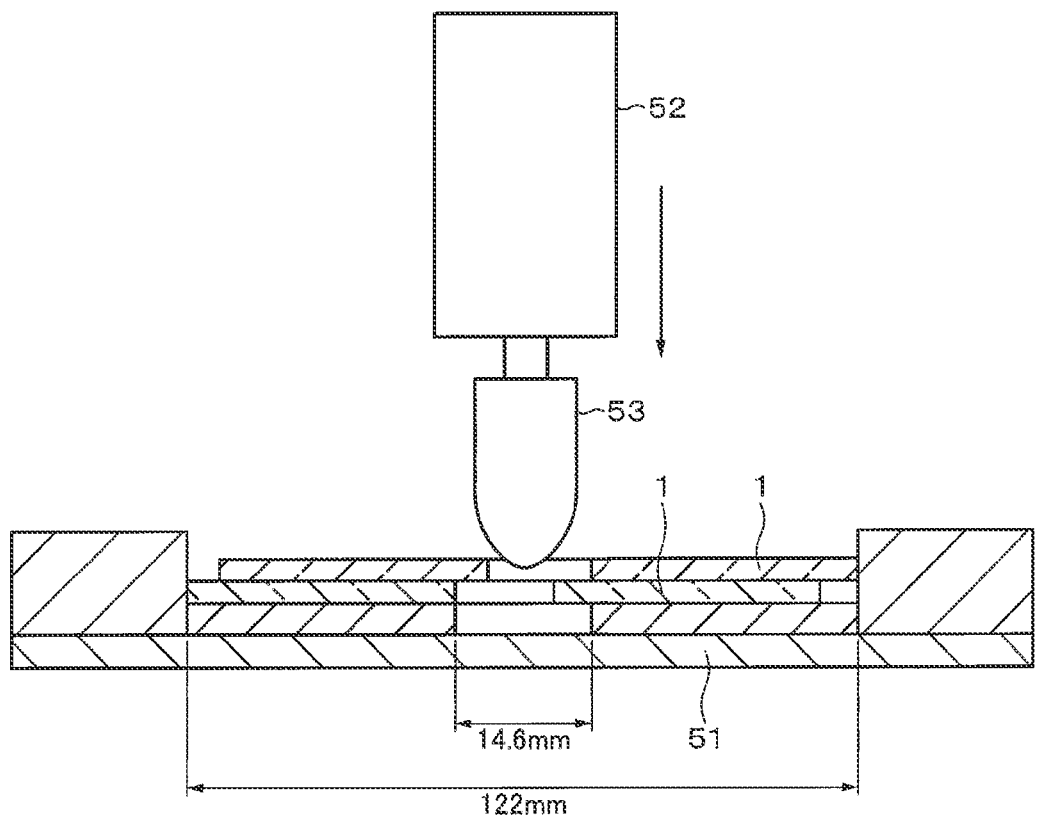
FIG. 7 is a schematic view for explaining a method for measuring sticking force.

FIG. 7 is a schematic view for explaining a method for measuring sticking force. First, two optical discs 1 obtained as described above were prepared, and superposed on the test stand 51 with the centers of the two optical discs 1 shifted in such a manner that the light irradiation surfaces (signal surfaces) faced each other, the end of the lower optical disc 1 touched the left wall surface, and the upper optical disc 1 touched the right wall surface. Next, a tip end element 53 (y 14.8 mm) attached to a digital force gauge 52 (manufactured by IMADA Co., Ltd., ZTS-20 N) was inserted into the center holes of the shifted and superposed optical discs 1. As a result, the two optical discs 1 that were shifted and superimposed moved while sliding in the in-plane direction, and the center holes of the two optical discs 1 were completely superimposed. At this time, the speed of the tip end element 53 was set to 10.00 mm/sec, and the moving distance of the tip end element 53 was set to 130 mm. The load during the movement of the tip end element 53 was measured by the digital force gauge 52. The measurement described above was repeated six times in total, and the maximum value (peak value) of each measurement was acquired. Next, the six acquired maximum values were averaged (arithmetic mean) to calculate the average sticking force. The results thereof are shown in Table 1 and FIG. 8.

(Antifouling Properties)

Figure 9:
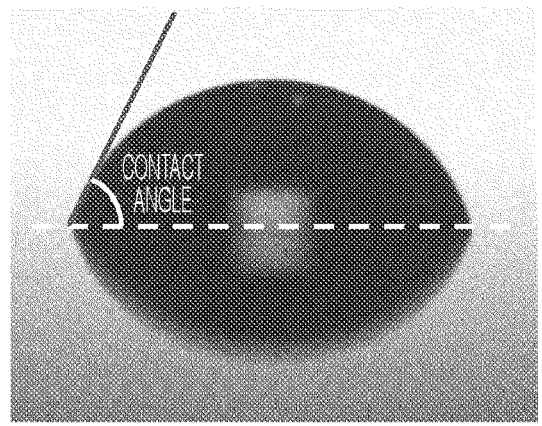
FIG. 9 is a photograph illustrating a measurement result of an average contact angle of triolein with respect to the surface of the first hard coat layer of Example 1.
Figure 10:
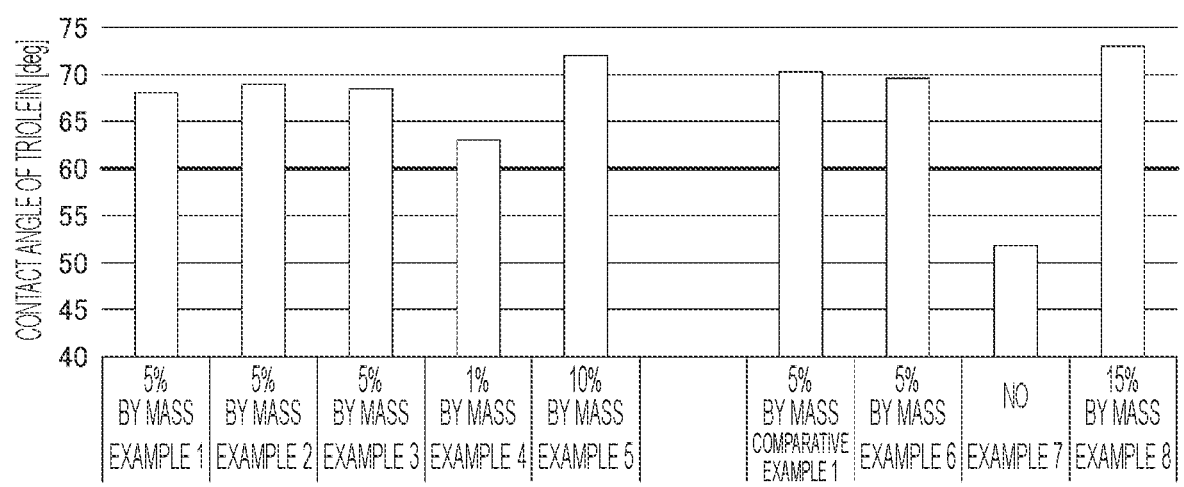
FIG. 10 is a graph illustrating system measurement results of average contact angles of triolein with respect to the first hard coat layer of Examples 1 to 8 and Comparative Example 1.
Figure 11A:
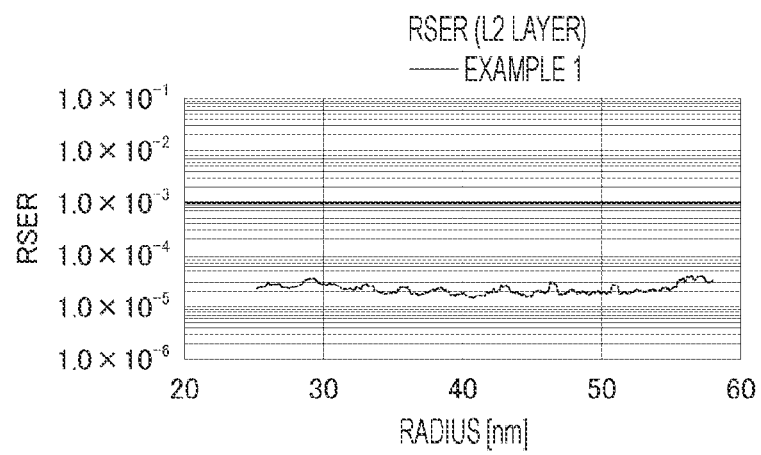
FIGS. 11A, 11B, and 11C are graphs illustrating measurement results of RSER of the optical discs of Example 1, Example 2, and Example 3, respectively.
Figure 11B:
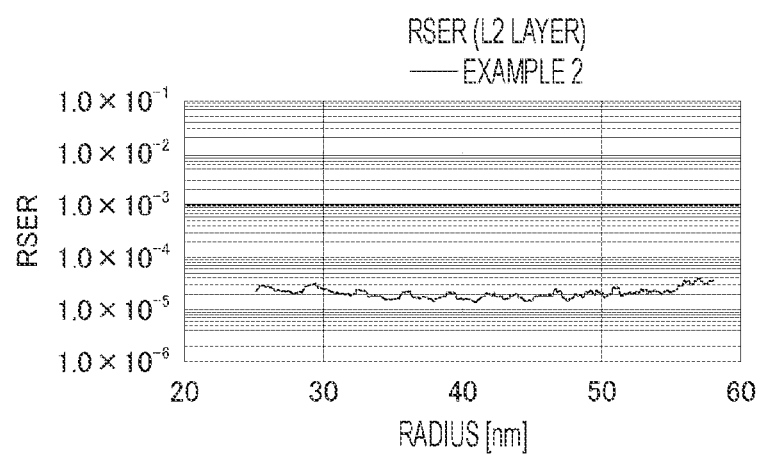
Figure 11C:
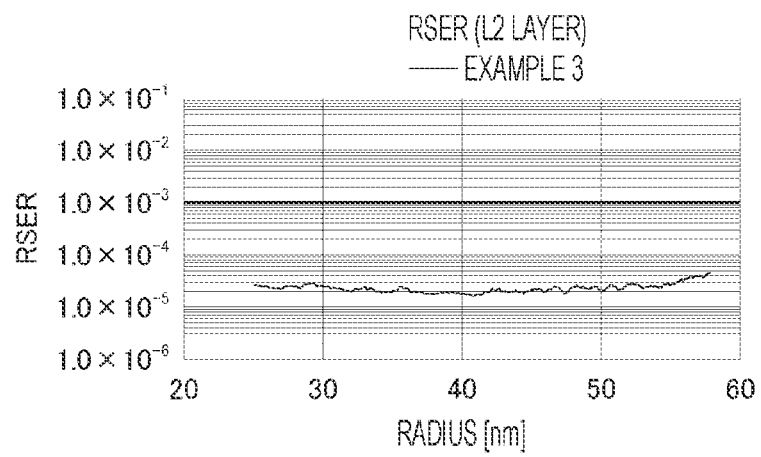
Figure 12A:
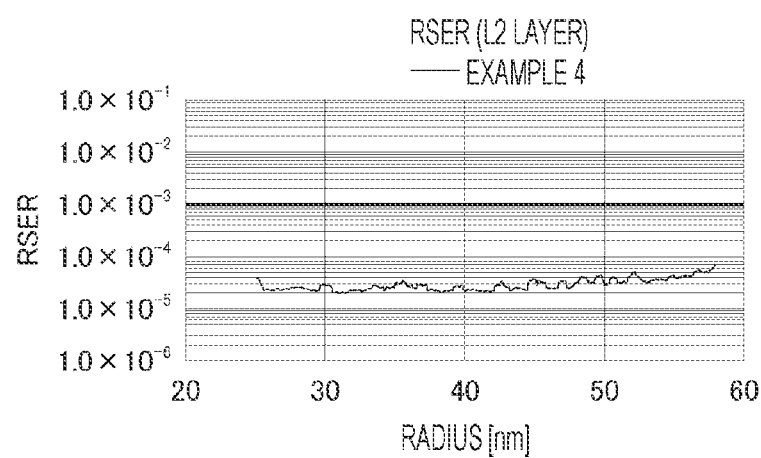
FIGS. 12A, 12B, and 12C are graphs illustrating measurement results of RSER of the optical discs of Example 4, Example 5, and Comparative Example 1, respectively.
Figure 12B:
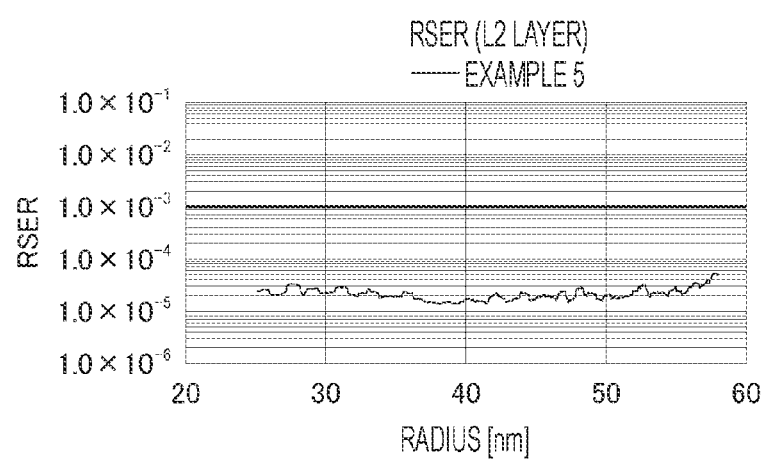
Figure 12C:
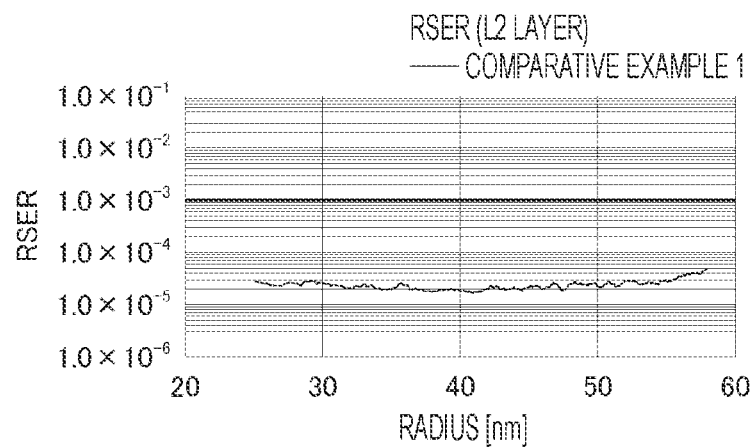
Figure 13:
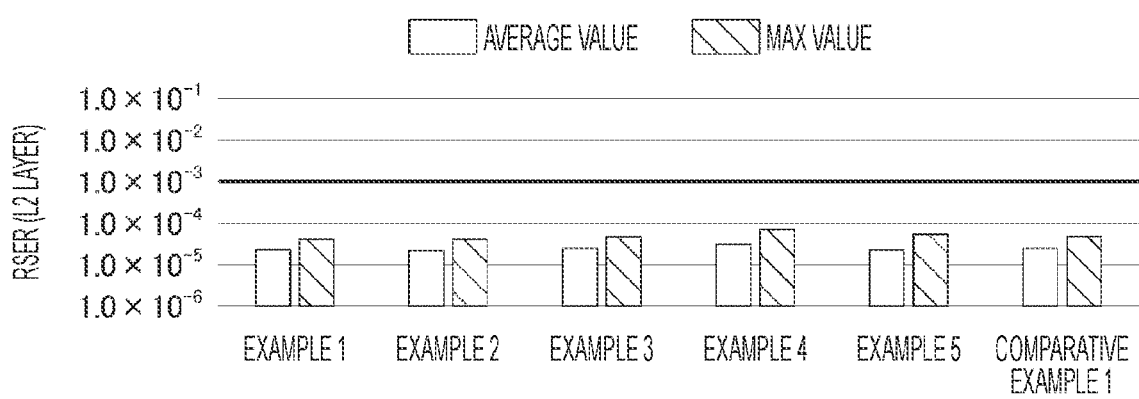

First, the measurement position was changed at intervals of 7 mm from the inner circumference (r=25 mm) to the outer circumference (r=53 mm) of the optical disc, and the contact angle of triolein with respect to the surface of the first hard coat layer was measured 5 times in total. For each contact angle measurement, a 2 μL of triolein droplet was dropped onto the surface of the first hard coat layer at a specified position, and the contact angle of triolein after 10 seconds from the droplet dropped was measured using a contact angle meter (manufactured by Kyowa Interface Science Co., Ltd., DropMaster DM500). Next, the five measured values were averaged (arithmetic average) to determine the average contact angle. The results thereof are shown in Table 1, FIG. 9, and FIG. 10. The oil is more easily repelled as the average contact angle of triolein is larger, and when the average contact angle of triolein is 60 degrees or more, excellent antifouling properties can be obtained.

(Reflectance, Focus Servo Residual)

The reflectance of the L2 layer (the L2 layer on the first hard coat layer side) and the focus servo residual of the L2 layer of the optical disc were measured using an evaluation machine (ODU-1000, wavelength λ=405 nm, objective lens NA=0.85) manufactured by Pulstec Industrial Co., Ltd. The results thereof are shown in Table 1.

Here, since the L2 layer is most affected by the optical state change of the first hard coat layer, the reflectance of the L2 layer and the focus servo residual of the L2 layer of the optical disc were measured as described above. The BD-DSD standard of the reflectance of the L2 layer is 2.0% or more and 4.0% or less, and the BD-DSD standard upper limit value of the focus servo residual of the L2 layer is 45 nm or less.

(Random Symbol Error Rate)

The Random Symbol Error Rate (RSER) of the entire surface of the L2 layer of the optical disc was measured using a drive evaluation machine (BDX-PR1AME, wavelength λ=405 nm, objective lens NA=0.85) manufactured by Pioneer Corporation. The entire surface of the L2 layer was recorded and reproduced in units of every 10,000 recording unit blocks (RUB), and the results of RSER during reproduction are shown in FIGS. 11A, 11B, 11C, 12A, 12B, and 12C FIG. 13 illustrates an average value of RSER in each optical disc in FIGS. 11A, 11B, 11C, 12A, 12B, and 12C and a MAX value which is a worst value of 10,000 block unit areas.

When the antiblocking agent is blended in ultraviolet curable resin for HC in an amount of 1% by mass or more, the highest height of the convexity can be 15 nm or more, and the area ratio of the convexity having a height of 10 nm or more can be 5% or more (see Examples 1 to 8).

When the antiblocking agent is blended in the ultraviolet curable resin for HC in an amount of 1% by mass or more and 20% by mass or less, the highest height of the convexity can be 15 nm or more and 200 nm or less, and the area ratio of the convexity having a height of 10 nm or more can be 5% or more (see Examples 1 to 5 and 7).

When the antiblocking agent is not blended in the ultraviolet curable resin for HC, the highest height of the convexity is 5 nm, and the area ratio of the convexity having a height of 10 nm or more is 0% (see Comparative Example 1).

TABLE 1

| Disc | Ultraviolet curable resin for HC | | Highest height of convexity H [nm] | Widest width of convexity W [nm] | Area ratio of convexity having height of 10 nm or more [%] | Observation result of surface of hard coat layer | Average sticking force [N] | Average contact angle [deg] | Reflectance of L2 layer [%] | Focus servo residual of L2 layer [nm] |
| --- | --- | --- | --- | --- | --- | --- | --- | --- | --- | --- |
| | Antiblocking agent [% by mass] | Antifouling agent (fluorine-containing monomer) [% by mass] | | | | | | | | |
| Example 1 | 10 | 5 | 55 | 500 | 39 | Smooth | 0.89 | 68.1 | 3.4 | 32 |
| Example 2 | 1 | 5 | 17 | 300 | 5 | Smooth | 1.31 | 69.0 | 3.6 | 24 |
| Example 3 | 20 | 5 | 150 | 750 | 95 | Smooth | 0.56 | 68.5 | 3.2 | 41 |
| Example 4 | 10 | 1 | 62 | 650 | 44 | Smooth | 1.31 | 63.0 | 3.4 | 21 |
| Example 5 | 10 | 10 | 49 | 450 | 63 | Smooth | 0.56 | 72.0 | 3.0 | 33 |
| Example 6 | 30 | 5 | 240 | 1100 | 99 | Smooth | 0.43 | 69.6 | 1.6 | 63 |
| Example 7 | 10 | No | 40 | 450 | 32 | Smooth | 0.75 | 51.8 | 3.7 | 29 |
| Example 8 | 10 | 15 | 135 | 800 | — | Orange peel defect occurred | 0.68 | 73.0 | Not measurable | Not measurable |
| Comparative Example 1 | No | 5 | 5 | — | 0 | Smooth | Not measurable | 70.3 | 3.5 | 18 |

[Discussion]

Figure 8:
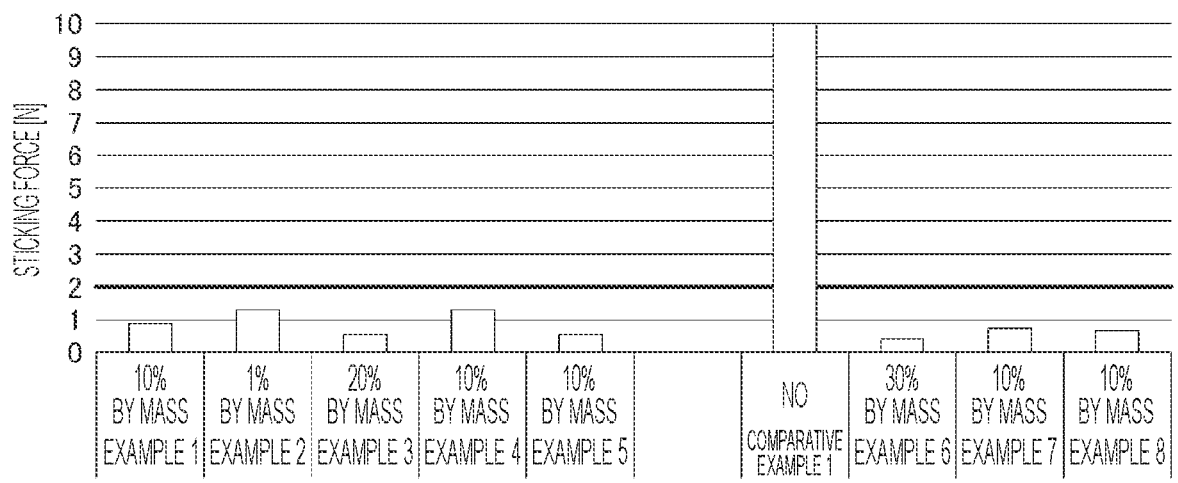
FIG. 8 is a graph illustrating system measurement results of average sticking forces of optical discs of Examples 1 to 8 and Comparative Example 1.

The following can be seen from Table 1 and FIG. 8.

When the highest height of the convexity is 15 nm or more and the area ratio of the convexity having a height of 10 nm or more is 5% or more, sticking of the stacked optical discs can be suppressed. Therefore, the average sticking force of the stacked optical discs can be 2 N or less of the standard (see Examples 1 to 8).

When the highest height of the convexity is 15 nm or more and 200 nm or less and the area ratio of the convexity having a height of 10 nm or more is 5% or more and 95% or less, sticking of the stacked optical discs can be suppressed, and the influence of the formation of the first and the second convex structure layers on the characteristics of the optical discs can be suppressed. Therefore, the average sticking force of the stacked optical discs can be set to 2 N or less of the standard, the L2 layer reflectance can be set within the range of the BD-DSD standard (2.0% or more and 4.0% or less), and in addition, the focus servo residual of the L2 layer can be set within the range of the BD-DSD standard upper limit value (45 nm or less) (see Examples 1 to 5 and 7).

When the highest height of the convexity is less than 15 nm and the area ratio of the convexity having a height of 10 nm or more is less than 5%, sticking occurs in the stacked optical discs (see Comparative Example 1). For this reason, when the measurement limit of the digital force gauge 52 is 10 N or more, the two stacked optical discs are not shifted.

The following can be seen from Table 1, FIG. 6A, and FIG. 6B.

In the optical disc using the ultraviolet curable resin For HC in which the blended amount of the antifouling agent is 1% by mass or more and 10% by mass or less, it is possible to make the average contact angle of triolein with respect to the surface of the first hard coat layer 60 degrees or more, while maintaining the smoothness of the surface of the first hard coat layer. Therefore, excellent antifouling properties can be imparted to the surface of the first hard coat layer while maintaining the smoothness of the surface of the first hard coat layer (see Examples 1 to 6 and Comparative Example 1)

In the optical disc using the ultraviolet curable resin for HC in which no antifouling agent is blended, the surface of the first hard coat layer is smooth, but the average contact angle of triolein with respect to the surface of the first hard coat layer is about 50 degrees, and the antifouling properties are low (see Example 7).

In the optical disc using the ultraviolet curable resin in which the blended amount of the antifouling agent is 15% by mass, an orange peel defect of several mm in size is formed on the entire surface of the first hard coat layer. Therefore, it is not possible to focus the laser beam on the L2 layer, and to measure the reflectance and the focus servo residual (see Example 8). The generation of the defect described above is considered to be due to the poor compatibility of the ultraviolet curable resin for HC because the blended amount of the antifouling agent is as large as 15% by mass.

The following can be seen from Table 1, FIGS. 11A, 11B, 11C, 12A, 12B, 12C, and 13.

The RSER of the optical disc of Examples 1 to 5 in which the highest height of the convexity is 15 nm or more and 200 nm or less and the area ratio of the convexity having a height of 10 nm or more is 5% or more and 95% or less is equivalent to the SER of the optical disc of Comparative Example 1 in which no antiblocking agent is blended and the surface of the first hard coat layer is smooth. Therefore, even when a plurality of convexities are formed on the surface of the first hard coat layer, the influence of formation of the plurality of convexities on recording and reproduction can be suppressed as long as the highest height of the convexity is set to 15 nm or more and 200 nm or less and the area ratio of the convexity having a height of 10 nm or more is set to 5% or more and 95% or less.

The embodiment and the modified examples thereof of the present disclosure have been specifically described above, but the present disclosure is not limited to the embodiment and modified examples described above thereof, and various modifications on the basis of the technical idea of the present disclosure are possible. For example, configurations, methods, steps, shapes, materials, numerical values, and the like described in the embodiment and modified examples described above are merely examples, and different configurations, methods, processes, shapes, materials, numerical values, and the like may be used as necessary. The configurations, methods, steps, shapes, materials, numerical values, and the like of the embodiment and modified examples described above can be combined with each other without departing from the gist of the present disclosure.

The chemical formulas of the compounds and the like exemplified in the above embodiments and modified examples are representative, and are not limited to the described valences and the like as long as they are common names of the same compounds. In numerical value ranges described in stages in the embodiment and modified examples described above, an upper limit value or a lower limit value of a numerical value range of a certain stage may be replaced with the upper limit value or the lower limit value of the numerical value range of another stage. The materials exemplified in the embodiments and modified examples described above may be used alone or in combination of two or more unless otherwise specified.

Furthermore, the present disclosure can also adopt the following configurations.

(1)
An optical recording medium including:
an optical recording medium main body that has a first surface and a second surface; and
a first convex structure layer that is provided on the first surface, in which
the first convex structure layer has a surface provided with a plurality of first convexities, and includes first particles and a first resin material, and
the plurality of first convexities are formed by a part of the first particles that are included in the first convex structure layer, the part of the first particles protruding from a surface of the first convex structure layer.

(2)
The optical recording medium according to (1), in which a highest height of the first convexity is 15 nm or more and 200 nm or less, and an area ratio of the first convexity having a height of 10 nm or more is 5% or more.

(3)
The optical recording medium according to (1) or (2), in which the first resin material contains fluorine.

(4)
The optical recording medium according to any one of (1) to (3), in which the first convex structure layer contains a fluorine-containing compound.

(5)
The optical recording medium according to any one of (1) to (4), in which an average contact angle of triolein with respect to a surface of the first convex structure layer is 60.0 degrees or more.

(6)
The optical recording medium according to any one of (1) to (5), in which the first convex structure layer includes a hard coat layer.

(7)
The optical recording medium according to any one of (1) to (6), in which the first particles include inorganic particles.

(8)
The optical recording medium according to (7), in which the inorganic particles contain silicon oxide.

(9)
The optical recording medium according to any one of (1) to (8), in which the first particles have an average particle diameter of 50 nm or more and 100 nm or less.

(10)
The optical recording medium according to any one of (1) to (9) further including:
a second convex structure layer that is provided on the second surface, in which
the second convex structure layer has a surface provided with a plurality of second convexities, and includes second particles and a second resin material, and
the plurality of second convexities are formed by a part of the second particles that are included in the second convex structure layer, the part of the second particles protruding from a surface of the second convex structure layer.

(11)
The optical recording medium according to any one of (1) to (10), in which
the optical recording medium main body includes:
a first disk; and
a second disk,
the first disk and the second disk include:
a substrate;
an information signal layer that is provided on the substrate; and
a cover layer that covers the information signal layer, and
a surface on a side of the substrate of the first disk and a surface on a side of the substrate of the second disk are bonded together.

REFERENCE SIGNS LIST 1, 101 Optical recording medium
2, 102 Optical recording medium main body
3 First convex structure layer
4 Second convex structure layer
3A, 4A Base layer
3B, 4B Convexity
10 First disk
20 Second disk
30 Bonding layer
11, 11A, 21 Substrate
12, 22 Light transmitting layer
13 Recording layer 14, 15 Protective layer
L0 to Ln, L0 to Lm Information signal layer
S1 to Sn, S1 to Sm Spacer layer
C Light irradiation surface
C1 First light irradiation surface
C2 Second light irradiation surface
Gv Groove
Ld Land
Tp Track pitch

The invention claimed is:

1. An optical recording medium, comprising:
   an optical recording medium main body that has a first surface and a second surface; and
   a first convex structure layer on the first surface, wherein
      the first convex structure layer has a surface provided with a plurality of first convexities, and includes first particles and a first resin material,
      the plurality of first convexities is formed by a part of the first particles that are included in the first convex structure layer, the part of the first particles protruding from the surface of the first convex structure layer, and
      an average contact angle of triolein with respect to the surface of the first convex structure layer is 60.0 degrees or more.

2. The optical recording medium according to claim 1, wherein a highest height of a convexity of the plurality of first convexities is 15 nm or more and 200 nm or less, and an area ratio of the convexity having a height of 10 nm or more is 5% or more.

3. The optical recording medium according to claim 1, wherein the first resin material contains fluorine.

4. The optical recording medium according to claim 1, wherein the first convex structure layer contains a fluorine-containing compound.

5. The optical recording medium according to claim 1, wherein the first convex structure layer includes a hard coat layer.

6. The optical recording medium according to claim 1, wherein the first particles include inorganic particles.

7. The optical recording medium according to claim 6, wherein the inorganic particles contain silicon oxide.

8. The optical recording medium according to claim 1, wherein the first particles have an average particle diameter of 50 nm or more and 100 nm or less.

9. The optical recording medium according to claim 1, further comprising:
   a second convex structure layer on the second surface, wherein
      the second convex structure layer has a surface provided with a plurality of second convexities, and includes second particles and a second resin material, and
      the plurality of second convexities is formed by a part of the second particles that are included in the second convex structure layer, the part of the second particles protruding from the surface of the second convex structure layer.

10. The optical recording medium according to claim 1, wherein
   the optical recording medium main body includes:
      a first disk; and
      a second disk,
      the first disk and the second disk include:
         a substrate;
         an information signal layer on the substrate; and
         a cover layer that covers the information signal layer, and
   a surface on a side of the substrate of the first disk and a surface on a side of the substrate of the second disk are bonded together.

* * * * *